US012791129B2

(12) United States Patent
Musto

(10) Patent No.: US 12,791,129 B2
(45) Date of Patent: Nov. 10, 2026

(54) PIPE CONNECTIONS HAVING CONCENTRIC OR CONSECUTIVE CLEATS

(71) Applicant: ADVANCED DRAINAGE SYSTEMS, INC., Hilliard, OH (US)

(72) Inventor: Nathan Musto, Columbus, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 18/907,694

(22) Filed: Oct. 7, 2024

(65) Prior Publication Data

US 2026/0098599 A1 Apr. 9, 2026

(51) Int. Cl.
*F16L 21/08* (2006.01)

(52) U.S. Cl.
CPC .................................... *F16L 21/08* (2013.01)

(58) Field of Classification Search
CPC ....... F16L 21/08; F16L 15/06; F16L 25/0036; F16L 25/0063; F16L 25/0045; F16L 37/2445; F16L 37/1215; F16L 47/06
USPC .................................................... 285/27, 391
See application file for complete search history.

(56) References Cited

U.S. PATENT DOCUMENTS

| | | | | | |
|---|---|---|---|---|---|
| 222,713 | A * | 12/1879 | Lawson | F16L 9/08 285/391 |
| 1,629,058 | A * | 5/1927 | Wilson | E21B 17/0426 285/391 |
| 1,645,032 | A * | 10/1927 | Wilson | F16L 37/2445 285/391 |
| 2015/0096764 | A1* | 4/2015 | Magnuson | E21B 17/046 166/380 |
| 2018/0313480 | A1* | 11/2018 | Lawrence | F16L 21/03 |
| 2024/0027010 | A1* | 1/2024 | Zarins | F16L 21/03 |

* cited by examiner

*Primary Examiner* — Aaron M Dunwoody
(74) *Attorney, Agent, or Firm* — FINNEGAN, HENDERSON, FARABOW, GARRETT & DUNNER L.L.P.

(57) ABSTRACT

A bell portion of a pipe is provided. The bell portion of the pipe may comprise a hollow body, an end extending from the body, a first cleat extending a first height from an internal surface of the end, a second cleat extending a second height from the internal surface of the end, and a third cleat extending a third height from the internal surface of the end.

17 Claims, 8 Drawing Sheets

PIPE CONNECTIONS HAVING CONCENTRIC OR CONSECUTIVE CLEATS

TECHNICAL FIELD

This disclosure relates generally to systems, methods, and devices for providing improved bell and spigot connections, and more particularly, to providing improved bell and spigot connections by using concentric or consecutive cleats.

BACKGROUND

Bell and spigot connections may be used to connect two or more pipes together. A first pipe may include a "bell" end, which may include an expanded diameter at the end of the pipe. A second pipe may include a plain end pipe segment that may be referred to as a "spigot." When connecting the two pipes together, the spigot end of the second pipe may be inserted into the bell end of the first pipe. Bell and spigot connections may provide a tight and secure connection between two or more pipes to maintain strength and hydraulic flow through the pipes. Bell and spigot connections may allow for easy installation and disassembly of pipe systems, which may facilitate easier installation, maintenance, and repairs. Bell and spigot connections may include the use of cleats in the bell portion to provide a secure connection between the bell and the spigot. Current techniques for bell and spigot connections may include cleats in the bell portion that are trapezoidal prisms. Such cleats may only engage the spigot portion at a specific location, which may prevent a secure connection between the bell and the spigot portions. Further, such cleats may limit the range of dimensions of spigot portions that may be secured within the bell portion.

Solutions are needed to improve these and other deficiencies in bell and spigot connections. Such solutions should create a more secure connection between the bell and the spigot portions by providing cleats in the bell portion that more fully engage the spigot portion. Such solutions should also provide cleats that can engage spigot portions with wider ranges of dimensions so that the bell portion can be used in more versatile applications.

SUMMARY

The disclosed embodiments describe systems, methods, and devices for a bell portion. These systems, methods, and devices may include a bell portion of a pipe which may comprise a hollow body, an end extending from the body, a first cleat extending a first height from an internal surface of the end, a second cleat extending a second height from the internal surface of the end, and a third cleat extending a third height from the internal surface of the end. In some embodiments, the first height may be less than the second height. In some embodiments, the second height may be less than the third height. In some embodiments, one or more of the first cleat, the second cleat, and the third cleat may comprise a rounded protrusion extending upwardly from the internal surface of the end. In some embodiments, one or more of the first cleat, the second cleat, and the third cleat may extend circumferentially around the internal surface of the end. In some embodiments, the first cleat, the second cleat, and the third cleat may extend around a portion of a circumference of the internal surface of the end. In some embodiments, one or more of the first cleat, the second cleat, and the third cleat may extend at least 10 degrees around the internal surface of the end. In some embodiments, one or more of the first cleat, the second cleat, and the third cleat may extend less than 180 degrees around the internal surface of the end. In some embodiments, one or more of the first cleat, the second cleat, and the third cleat may be configured to engage a spigot portion installed within the end. In some embodiments, one or more of the first cleat, the second cleat, and the third cleat may comprise a wedge profile.

The disclosed embodiments may further include a bell portion of a pipe which may comprise a hollow body, an end extending from the body, and at least one set of cleats, wherein the at least one set of cleats may comprises a first cleat extending a first height from an internal surface of the end, a second cleat extending a second height from the internal surface of the end, and a third cleat extending a third height from the internal surface of the end. In some embodiments, one or more of the first cleat, the second cleat, and the third cleat may comprise a wedge-shaped profile extending upward from the internal surface of the end. In some embodiments, the first height may be less than the second height. In some embodiments, the second height may be less than the third height. In some embodiments, the at least one set of cleats may comprise four sets of cleats. In some embodiments, each of the at least one set of cleats may be spaced equidistantly around a circumference of the internal surface.

The disclosed embodiments may further include a spigot portion of a pipe, which may comprise a hollow body, at least one set of cleats, wherein the at least one set of cleats may comprise a first cleat extending a first height from an external surface of the body, a second cleat extending a second height from the external surface of the body, and a third cleat extending a third height from the external surface of the body. In some embodiments, the spigot portion may further comprise a rib extending between the first cleat, the second cleat, and the third cleat. In some embodiments, the first height may be less than the second height. In some embodiments, the second height may be less than the third height.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

The accompanying drawings constitute a part of this specification. The drawings illustrate several embodiments of the present disclosure, and together with the description, serve to explain the principles of the disclosed embodiments.

DETAILED DESCRIPTION

Examples of embodiments of the present disclosure are described with reference to the accompanying drawings. In the figures, which are not necessarily drawn to scale, wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise.

The disclosed embodiments improve deficiencies in existing bell and spigot connections. The disclosed embodiments provide more secure connections between a bell portion of a pipe or fitting and spigot portion of a pipe or fitting. Further, the disclosed embodiments allow a bell portion to accommodate a wider range of dimensions of spigot portions.

Figure 1:
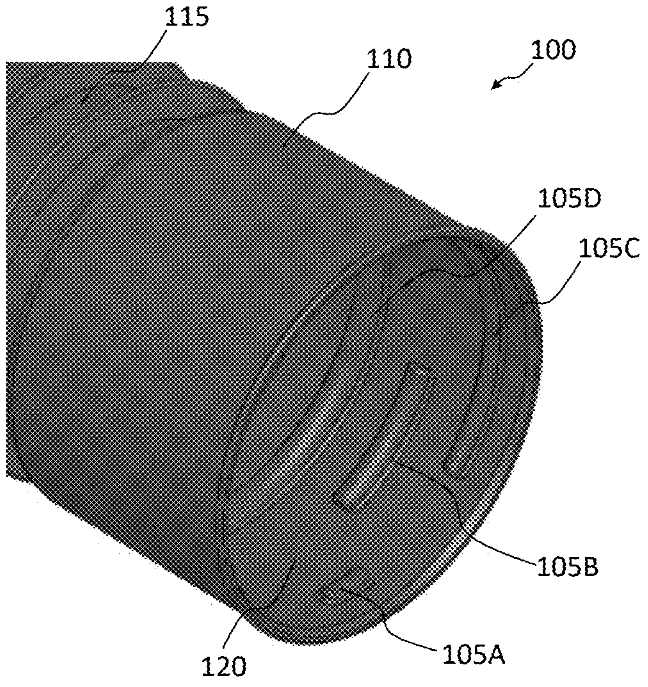
FIG. 1 depicts an isometric view of a bell portion with concentric axisymmetric cleats, according to disclosed embodiments.

FIG. 1 depicts an isometric view of bell portion 110 of pipe 100. Pipe 100 may comprise a single wall, dual wall, or triple wall corrugated, or smooth pipe formed of various plastic materials. In some embodiments, pipe 100 may be formed of other non-plastic materials. As depicted in FIG. 1, bell portion 110 of pipe 100 may have a wider diameter than body 115 of pipe 100. The wider diameter of bell portion 110 may facilitate the connection of a spigot portion to bell portion 110. For example, a spigot portion (not depicted) may be inserted into bell portion 110 to facilitate the flow of water through body 115 to the spigot portion.

Bell portion 110 may include a plurality of cleats 105A-105D extending upwardly from internal surface 120 of bell portion 110. Cleats 105A-105D may facilitate a tight and secure connection between internal surface 120 of bell portion 110 and a spigot portion inserted into bell portion 110. Cleats 105A-105D may include a rounded profile. For example, cleats 105A-105D may comprise a semi-circular, rounded protrusion that may extend upwardly from internal surface 120 of bell portion 110. In some embodiments, as depicted in FIG. 1, cleats 105A-105D may include the same rounded profile. In other embodiments, the cleats may include differing profiles, such as a wedge-shaped profile and a rounded profile.

In some embodiments, cleats, such as cleats 105A, 105B, and 105C, may extend circumferentially around only a portion of internal surface 120. In such embodiments, the length of cleats 105A, 105B, and 105C may vary or may be equal. In other embodiments, cleats, such as cleat 105D, may extend around the entire circumference of internal surface 120. In some embodiments, each of cleats 105A-105D may extend a minimum of 10° around the circumference of internal surface 120. In some embodiments cleats 105A-105D may extend a maximum of 120° to 180° around the circumference of internal surface 120. In some embodiments, the minimum overall contact angle of cleats 105A-105D may be 30°.

Because cleats 105A-105D extend circumferentially around part or all of internal surface 120, cleats 105A-105D may provide improved engagement with a spigot portion. This may provide a tighter, more secure connection between bell portion 110 and a spigot portion. Cleats 105A-105D may also be radially symmetric, which may center a spigot portion within the inner circumference of bell portion 110. This may further provide a tighter, more secure connection between bell portion 110 and the spigot portion and may facilitate the flow of water through the connected bell portion 110 and the spigot portion. In some embodiments, cleats 105A-105D may be made from the same material. In other embodiments, cleats 105A-105D may be made from different material to allow for various pipe connection cases, such as watertight connections, soil-tight connections, and connections with differing types of pipes (such as corrugated, smooth wall, etc.).

In some embodiments, as depicted in FIG. 1, there may be three rows of cleats 105A-105D. In other embodiments, there may be more or fewer rows of cleats. A height of the cleats from internal surface 120 may vary. For example, the height of cleats 105A and 105C may be less than the height of cleat 105B, and the height of cleat 105B may be less than the height of cleat 105D. Varying heights of cleats 105A-105D may allow bell portion 110 to engage a plurality of spigot portions with varying diameters. For example, a spigot portion with a larger outer diameter may engage with cleats 105A and 105C because cleats 105A and 105C have a lower height from internal surface 120. A spigot portion with a smaller outer diameter, for example, may engage with cleat 105D at the internal portion of end 110 because cleat 105D extends higher from internal surface 120.

Figure 2:
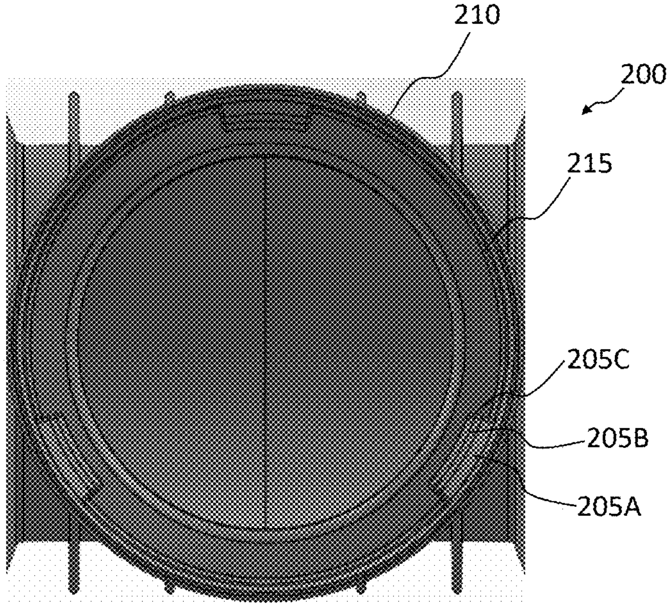
FIG. 2 depicts a front view of a bell portion of a T-shaped fitting with concentric axisymmetric cleats, according to disclosed embodiments.

FIG. 2 depicts a front view of bell portion 210 of a T-shaped fitting 200 with wedge-shaped cleats 205A-205C. Cleats 205A-205C may facilitate a tight and secure connection between internal surface 215 of bell portion 210 and a spigot portion. Cleats 205A-205C may include a wedge-shaped profile. For example, cleats 205A-205C may extend from internal surface 215 of bell portion 210 of T-shaped fitting 200 at an angle, creating a triangular, wedge shape that may engage with a spigot portion. Further, cleats 205A-205C may extend circumferentially around a portion of internal surface 215. Accordingly, when a spigot portion is installed within bell portion 210 of T-shaped fitting 200, the rounded top edge of cleat 205A-205C may engage the spigot portion along the entire top edge. Further, the radially symmetric positioning of cleats 205A-205C around internal surface 215 may center the spigot portion within bell portion 210 of T-shaped fitting 200. In some embodiments, as depicted in FIG. 2, cleats 205A-205C may include the same wedge-shaped profile. In other embodiments, the cleats may include differing profiles, such as a wedge-shaped profile and a rounded profile. In some embodiments, as depicted in FIG. 2, bell portion 210 may include three sets of cleats 205A-205C. In other embodiments, bell portion 210 may include more or fewer sets of cleats 205A-205C.

As depicted in FIG. 2, cleats 205A-205C may be of varying sizes. For example, the height of cleat 205A may be less than the height of cleat 205B, and the height of cleat 205B may be less than the height of cleat 205C. Varying heights of cleats 205A-205C may allow bell portion 210 to engage a plurality of spigot portions with varying diameters. For example, a spigot portion with a larger outer diameter may engage with cleat 205A because cleat 205A may have a lower height from internal surface 215. A spigot portion with a smaller outer diameter may engage with cleat 205C because cleat 205C may extend higher from internal surface 215.

Cleats 205A-205C may further provide structural support to bell portion 210 by providing an increased surface area of internal surface 215. Cleats 205A-205C may further engage a spigot portion such that the connection between the spigot portion and bell portion 210 is watertight. Although FIG. 2 depicts three cleats 205A-205C in each set of cleats, bell portion 210 may include more or fewer cleats in each set of cleats. In some embodiments, cleats 205A-205C may be made from the same material. In other embodiments, cleats 205A-205C may be made from different material to allow for various pipe connection cases, such as watertight connections, soil-tight connections, and connections with differing types of pipes (such as corrugated, smooth wall, etc.).

Figure 3:
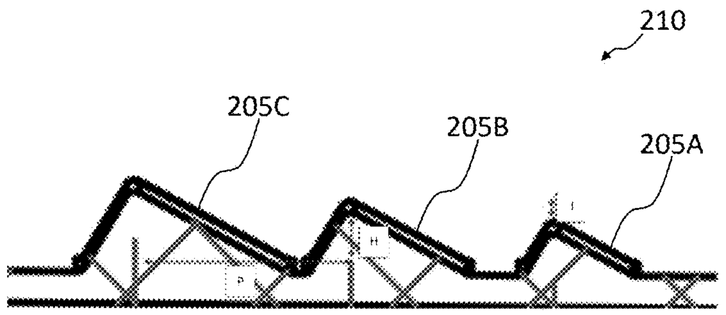
FIG. 3 depicts a side view of a bell portion with concentric axisymmetric cleats, according to disclosed embodiments.

FIG. 3 depicts a side view of an embodiment of bell portion 210 with cleats 205A-205C. As depicted in FIG. 3, cleats 205A-205C may comprise a wedge-shaped profile. Cleats 205A-205C may include a pitch P. Pitch P may comprise a distance between the tips of two adjacent cleats. For example, pitch P may comprise a distance between the tip of cleat 205B and the tip of cleat 205C. Pitch P may range from one eighth to one fifth of an internal diameter of bell portion 210. For example, if an internal diameter of bell portion 210 is 10 inches, pitch P may range from 1.25 inches to 2 inches. Cleats 205A-205C may include a height H. Height H may comprise a distance that each of cleats 205A-205C extends above the internal surface of bell portion 210. The height H of each of cleats 205A-205C may range from one hundredth to two fifteenths of an internal diameter of bell portion 210. For example, if an internal diameter of bell portion 210 is 10 inches, then height H of cleats 205A-205C may range from 0.1 inches to 1.33 inches. Cleats 205A-205C may further include increase I. Increase I may include a difference in height from cleat 205A to cleat 205B and cleat 205C. Increase I may range from zero to one fifteenth of an internal diameter of bell portion 210. For example, if an internal diameter of bell portion 210 is 10 inches, then increase I may range from 0 inches to 0.66 inches. Bell portion 100 may include three cleats 205A-205C, as depicted in FIG. 3. In other embodiments, bell portion 100 may include more or fewer cleats.

Figure 4A:
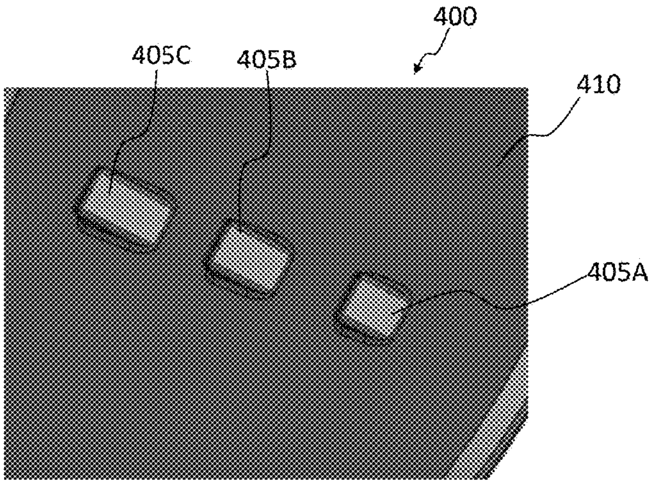
FIG. 4A depicts an isometric view of a bell portion with consecutive cleats, according to disclosed embodiments.
Figure 4B:
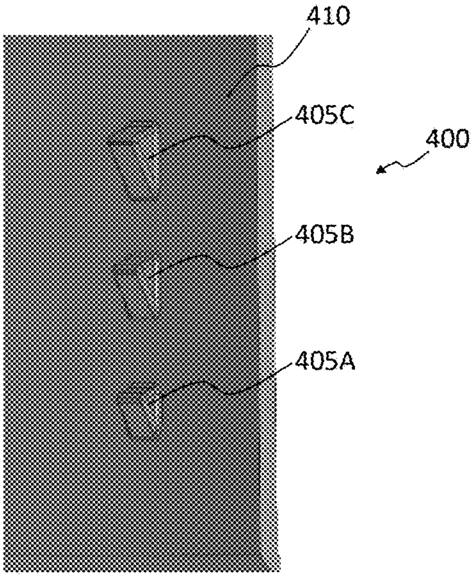
FIG. 4B depicts an angled view of a bell portion with consecutive cleats, according to disclosed embodiments.

FIG. 4A and FIG. 4B depict an enlarged view of bell portion 400 with consecutive cleats, according to disclosed embodiments. Bell portion 400 may correspond to bell portion 110, as disclosed herein with respect to FIG. 1. Bell portion 400 may include a plurality of cleats 405A-405C extending upwardly from internal surface 410 of bell portion 400. Cleats 405A-405C may facilitate a tight and secure connection between bell portion 400 and a spigot portion (not depicted). Cleats 405A-405C may include a wedge-shaped profile. For example, cleats 405A-405C may comprise a wedge-shaped protrusion that may extend upwardly from internal surface 410 of bell portion 400. In some embodiments, as depicted in FIG. 4A and FIG. 4B, cleats 405A-405C may include the same wedge-shaped profile. In other embodiments, the cleats may include differing profiles, such as a wedge-shaped profile and a rounded profile. In some embodiments, bell portion 400 may include three rows of consecutive cleats, such as cleats 405A-405C. In other embodiments, bell portion 400 may include more or fewer consecutive cleats. In some embodiments, as depicted in FIGS. 4A and 4B, cleats 405A-405C may be equally spaced apart from each other. In other embodiments, cleats 405A-405C may be directly adjacent to each other or may be unequally spaced. In some embodiments, cleats 405A-405C may be made from the same material. In other embodiments, cleats 405A-405C may be made from different material to allow for various pipe connection cases, such as watertight connections, soil-tight connections, and connections with differing types of pipes (such as corrugated, smooth wall, etc.).

In some embodiments, the height of the cleats from internal surface 410 may vary. For example, the height of cleat 405A may be less than the height of cleat 405B, and the height of cleat 405B may be less than the height of cleat 405C. The increase in height between cleats 405A-405C may allow bell portion 400 to engage a plurality of spigot portions with varying diameters. For example, a spigot portion with a larger outer diameter may engage with cleat 405A because cleat 405A has a lower height from internal surface 410. A spigot portion with a smaller outer diameter may engage with cleat 405C because cleat 405C may extend higher from internal surface 410.

Figure 5:
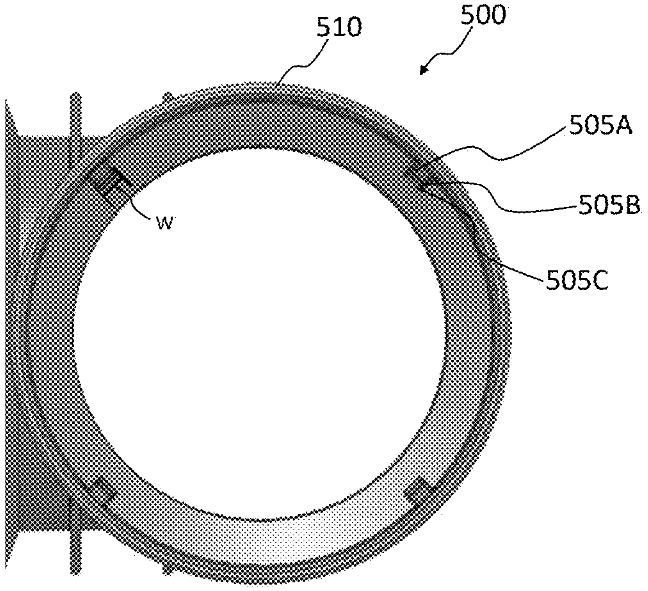
FIG. 5 depicts a front view of a bell portion of a T-shaped fitting with consecutive cleats, according to disclosed embodiments.

FIG. 5 depicts a front view of bell portion 510 of T-shaped fitting 500. As depicted in FIG. 5, bell portion 510 may include four sets of consecutive cleats 505A-505C. In other embodiments, bell portion 510 may include more or fewer sets of consecutive cleats. Cleats 505A-505C may correspond to cleats 405A-405C, as disclosed herein with respect to FIGS. 4A and 4B. Each set of consecutive cleats may be spaced equidistantly apart around the inner circumference of bell portion 510. Equidistant spacing of each set of consecutive cleats may increase engagement of each cleat with an installed spigot portion, which may create a tighter and more secure connection. This spacing may further center a spigot portion installed within bell portion 510 which may facilitate the flow of water from bell portion 510 to the spigot portion. In some embodiments, each of cleats 505A-505C may be the same width W. Width W may be a minimum of one twentieth of an internal diameter of bell portion 510. For example, if an internal diameter of bell portion 510 is 10 inches, then a minimum width W of each of cleats 505A-505C may be 0.5 inches. In other embodiments, each of cleats 505A-505C may have varying widths.

Figure 6:
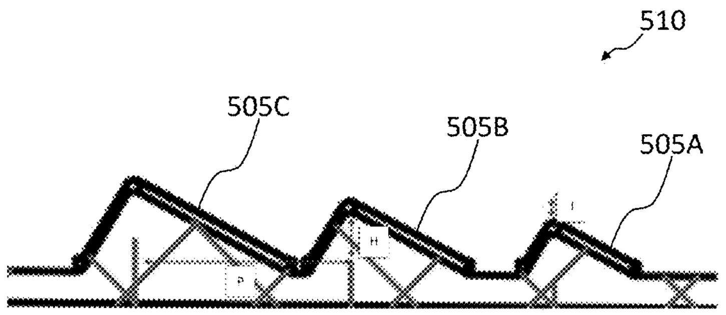
FIG. 6 depicts a side view of a bell portion with consecutive cleats, according to disclosed embodiments.

FIG. 6 depicts a side view of bell portion 510 with consecutive cleats 505A-505C. As depicted in FIG. 6, cleats 505A-505C may comprise a wedge-shaped profile. Cleats 505A-505C may include a pitch P. Pitch P may comprise a distance between the tips of two adjacent cleats. For example, pitch P may comprise a distance between the tip of cleat 505C and the tip of cleat 505B. Pitch P may range from one eighth to one fifth of an internal diameter of bell portion 510. For example, if an internal diameter of bell portion 510 is 10 inches, then pitch P may range from 1.25 inches to 2 inches. Cleats 505A-505C may include a height H. Height H may comprise a distance that each of cleats 505A-505C extends above the internal surface of bell portion 510. The height H of each of cleats 505A-505C may range from one hundredth to two fifteenths of an internal diameter of bell portion 510. For example, if an internal diameter of bell portion 510 is 10 inches, then height H of cleats 505A-505C may range from 0.1 inches to 1.33 inches. Cleats 505A-505C may further include increase I. Increase I may include a difference in height from cleat 505A to cleat 505B and cleat 505C. Increase I may range from zero to one fifteenth of an internal diameter of bell portion 510. For example, if an internal diameter of bell portion 510 is 10 inches, then increase I may range from 0 inches to 0.66 inches. Bell portion 510 may include three cleats 505A-505C, as depicted in FIG. 6. In other embodiments, bell portion 510 may include more or fewer cleats.

Figure 7A:
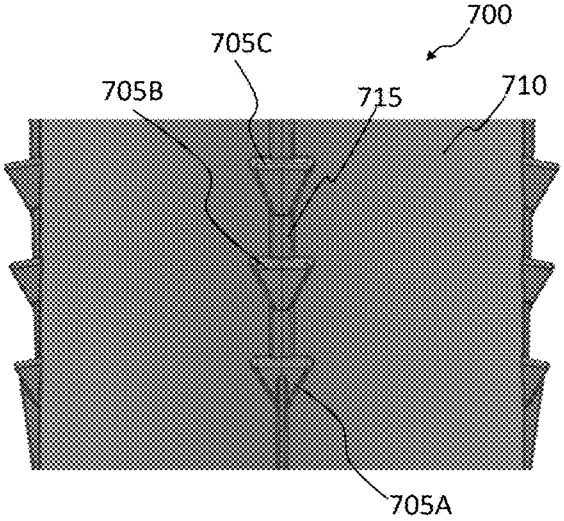
FIG. 7A depicts a front view of a spigot portion with consecutive cleats, according to disclosed embodiments.
Figure 7B:
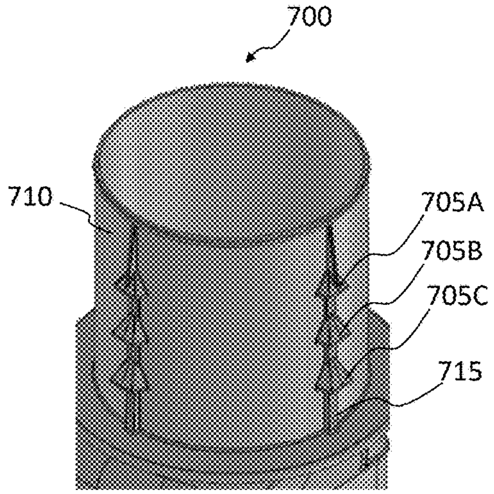
FIG. 7B depicts an isometric view of a spigot portion with consecutive cleats, according to disclosed embodiments.

FIG. 7A and FIG. 7B depict spigot portion 700 with consecutive cleats. Spigot portion 700 may comprise an end of a single wall, dual wall, or triple wall corrugated or smooth pipe formed of various plastic materials. In some embodiments, spigot portion 700 may be formed of other non-plastic materials. Spigot portion 700 may include an end of a pipe that may be inserted into a bell portion, such as bell portion 110 or bell portion 400.

Spigot portion 700 may include a plurality of consecutive cleats 705A-705C extending upwardly from external surface 710 of spigot portion 700. Cleats 705A-705C may facilitate a tight and secure connection between external surface 710 of spigot portion 700 and a bell portion (not depicted). Cleats 705A-705C may include a triangular, wedge-shaped profile. For example, cleats 705A-705C may comprise a wedge-shaped protrusion that may extend upwardly from external surface 710 of spigot portion 700. In some embodiments, as depicted in FIG. 7A and FIG. 7B, cleats 705A-705C may include the same wedge-shaped profile. In other embodiments, the cleats may include differing profiles, such as a wedge-shaped profile and a rounded profile. In some embodiments, spigot portion 700 may include three rows of consecutive cleats, such as cleats 705A-705C. In other embodiments, spigot portion 700 may include more or fewer consecutive cleats. In some embodiments, as depicted in FIGS. 7A and 7B, cleats 705A-705C may be equally spaced apart from each other. In other embodiments, cleats 705A-705C may be directly adjacent to each other, may be spaced along and follow a path, or may be unequally spaced. In some embodiments, cleats 705A-705C may be made from the same material. In other embodiments, cleats 705A-705C may be made from different material to allow for various pipe connection cases, such as watertight connections, soil-tight connections, and connections with differing types of pipes (such as corrugated, smooth wall, etc.). Spigot portion 700 may further include rib 715 which may extend between each of cleats 705A-705C. Rib 715 may extend vertically from external surface 710 of spigot portion 700. Rib 715 may provide structural support and reinforcement to spigot portion 700, which may facilitate a more secure and tight connection between spigot portion 700 and a bell portion. In some embodiments, spigot portion 700 may not include rib 715.

In some embodiments, the height of the cleats may vary. For example, the height of cleat 705A may be less than the height of cleat 705B, and the height of cleat 705B may be less than the height of cleat 705C. The increase in height between cleats 705A-705C may allow spigot portion 700 to engage a plurality of bell portions with varying diameters. For example, a bell portion with a larger inner diameter may engage with cleat 705C because cleat 705C extends higher from external surface 710. A spigot portion with a smaller inner diameter may engage with cleat 705A because cleat 705A may have a lower height from external surface 710.

Figure 8:
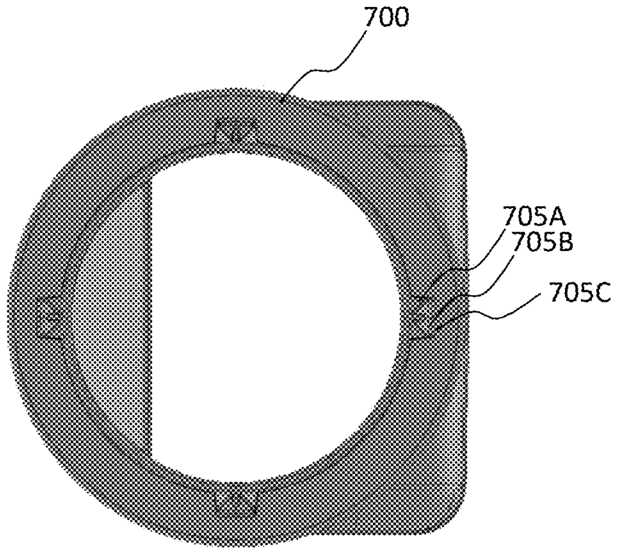
FIG. 8 depicts a front view of a spigot portion with consecutive cleats, according to disclosed embodiments.

As depicted in FIG. 8, spigot portion 700 may include four sets of consecutive cleats 705A-705C. In other embodiments, spigot portion 700 may include more or fewer sets of consecutive cleats. Each set of consecutive cleats may be spaced equidistantly apart around the outer circumference of spigot portion 700. Equidistant spacing of each set of consecutive cleats may increase engagement of each cleat with an installed bell portion, which may create a tighter and more secure connection. This spacing may further center spigot portion 700 when spigot portion 700 is installed within a bell portion, which may facilitate the flow of water from the bell portion to the spigot portion 700.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A bell portion of a pipe, comprising:

a hollow body;

an end extending from the body;

a first cleat extending a first height from an internal surface of the end and a first length around the internal surface of the end;

a second cleat extending a second height from the internal surface of the end and a second length around the internal surface of the end; and a third cleat extending a third height from the internal surface of the end and a third length around the internal surface of the end, wherein the first length, the second length, and the third length vary, and wherein the first cleat, the second cleat, and the third cleat are positioned radially symmetrically within a circumference of the end.

2. The bell portion of claim 1, wherein the first height is less than the second height.

3. The bell portion of claim 2, wherein the second height is less than the third height.

4. The bell portion of claim 1, wherein the first cleat, the second cleat, and the third cleat each comprise a rounded protrusion extending upwardly from the internal surface of the end.

5. The bell portion of claim 1, wherein the first cleat, the second cleat, and the third cleat each extend circumferentially around the internal surface of the end.

6. The bell portion of claim 1, wherein the first cleat, the second cleat, and the third cleat extend around a portion of a circumference of the internal surface of the end.

7. The bell portion of claim 1, wherein the first cleat, the second cleat, and the third cleat extend at least 10 degrees around the internal surface of the end.

8. The bell portion of claim 1, wherein the first cleat, the second cleat, or the third cleat extend less than 180 degrees around the internal surface of the end.

9. The bell portion of claim 1, wherein the first cleat, the second cleat, and the third cleat are configured to engage a spigot portion installed within the end.

10. The bell portion of claim 1, wherein the first cleat, the second cleat, and the third cleat comprise a wedge profile.

11. A bell portion of a pipe, comprising:

a hollow body;

an end extending from the body;

at least one set of cleats, wherein the at least one set of cleats comprises:

a first cleat extending a first height from an internal surface of the end;

a second cleat extending a second height from the internal surface of the end; and a third cleat extending a third height from the internal surface of the end, wherein the first cleat, the second cleat, and the third cleat are unequally spaced from one another along a length of the end; and wherein the first height is less than the second height.

12. The bell portion of claim 11, wherein the first cleat, the second cleat, and the third cleat comprise a wedge-shaped profile extending upward from the internal surface of the end.

13. The bell portion of claim 11, wherein the second height is less than the third height.

14. The bell portion of claim 11, wherein the at least one set of cleats comprises four sets of cleats.

15. A spigot portion of a pipe, comprising:

a hollow body at least one set of cleats, wherein the at least one set of cleats comprises:

a first cleat extending a first height from an external surface of the body;

a second cleat extending a second height from the external surface of the body; and a third cleat extending a third height from the external surface of the body;

a rib extending between the first cleat, the second cleat, and the third cleat, wherein the rib extends vertically from the external surface of the body, and wherein the first cleat, the second cleat, and the third cleat are unequally spaced from one another along a length of the body.

16. The spigot portion of claim 15, wherein the first height is less than the second height.

17. The spigot portion of claim 16, wherein the second height is less than the third height.

* * * * *